US012677757B2

(12) United States Patent
Corley

(10) Patent No.: US 12,677,757 B2
(45) Date of Patent: Jul. 14, 2026

(54) PLANT DISPLAY DEVICE

(71) Applicant: Steven Corley, Mendocino, CA (US)

(72) Inventor: Steven Corley, Mendocino, CA (US)

( * ) Notice: Subject to any disclaimer, the term of this patent is extended or adjusted under 35 U.S.C. 154(b) by 0 days.

(21) Appl. No.: 19/010,820

(22) Filed: Jan. 6, 2025

(65) Prior Publication Data

US 2025/0234815 A1 Jul. 24, 2025

Related U.S. Application Data

(60) Provisional application No. 63/623,879, filed on Jan. 23, 2024.

(51) Int. Cl.
*A01G 9/02* (2018.01)

(52) U.S. Cl.
CPC .................................... *A01G 9/023* (2013.01)

(58) Field of Classification Search
CPC ........ A01G 9/024; A01G 9/025; A01G 9/022; A47G 7/044
See application file for complete search history.

(56) References Cited

U.S. PATENT DOCUMENTS

| | | | | |
|---|---|---|---|---|
| 214,061 | A | * | 4/1879 | Stearns .................. A47G 7/047 |
| | | | | 47/41.01 |
| 1,989,294 | A | | 1/1935 | Serpico |

| | | | | |
|---|---|---|---|---|
| 2,588,596 | A | | 3/1952 | Weber |
| 2,771,642 | A | | 11/1956 | Czys |
| 6,749,163 | B1 | | 6/2004 | Lee |
| 8,132,366 | B1 | * | 3/2012 | LeBlanc .................. A01C 1/02 |
| | | | | 211/124 |
| 9,642,314 | B1 | * | 5/2017 | Joseph .................. A01G 7/045 |
| 2007/0245625 | A1 | | 10/2007 | Lennon |
| 2011/0088317 | A1 | | 4/2011 | Goldberg |
| 2019/0254241 | A1 | * | 8/2019 | Woerner ............. E04H 17/1413 |

FOREIGN PATENT DOCUMENTS

| | | | | | |
|---|---|---|---|---|---|
| DE | 20117682 | U1 | * | 2/2002 | ............. A47H 27/00 |
| DE | 202011004607 | U1 | * | 8/2012 | ............. A47G 7/044 |

* cited by examiner

*Primary Examiner* — Kristen C Hayes
(74) *Attorney, Agent, or Firm* — Brennan, Manna & Diamond, LLC

(57) ABSTRACT

A plant display device is disclosed which can be anchored within a window and is capable of supporting several potted plants simultaneously. The plant display device comprises a pair of independent vertical bars aligned vertically on opposite sides of the window and clamped into place. Then, multiple horizontal bars are installed at different heights along the vertical length. Each horizontal bar can support several potted plant holders held in place by a nut and bolt fixture. Users can screw the nut and bolt fixtures onto the horizontal bars to display their potted plants within the circular holders. Users can display their plants in a custom manner without worry of the plants being dropped or knocked over by children, pets, etc.

18 Claims, 3 Drawing Sheets

PLANT DISPLAY DEVICE

CROSS-REFERENCE TO RELATED APPLICATION

The present application claims priority to, and the benefit of, U.S. Provisional Application No. 63/623,879, which was filed on Jan. 23, 2024, and is incorporated herein by reference in its entirety.

FIELD OF THE INVENTION

The present invention relates generally to the field of plant display devices. More specifically, the present invention relates to a torsion anchor system for windows that can support potted plants. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in plant display devices. Generally, people may enjoy displaying plants within their homes. However, plants are commonly stored within a pot and must be placed on a counter, table, or directly on a windowsill. Thus, because of this people may have little space for multiple plants within a home or apartment. Accordingly, some people may attempt to utilize other means to hang and display plants. However, hardware to hang plants may require permanent modifications to a home which can be expensive.

Furthermore, plants that are not secure enough or out of the way of children and pets can get easily knocked over and ruined. Children and pets can get into plants that are not positioned high enough out of the way of little hands and paws. Some of these plants may be harmful to pets and/or children and need to be kept out of reach for safety reasons.

Accordingly, there is a demand for an improved plant display device that provides a window support system for multiple plants. More particularly, there is a demand for a plant display device that saves space in homes, offices, and apartments.

Therefore, there exists a long-felt need in the art for a plant display device that provides users with a torsion anchor system for windows that can support potted plants. There is also a long-felt need in the art for a plant display device that features a vertical clamping bar on both sides of the window that supports multiple adjustable horizontal bars and potted plant holders. Further, there is a long-felt need in the art for a plant display device that enables users to adjust the plant holders to various angles and positions to customize their look in the window. Moreover, there is a long-felt need in the art for a device that saves considerable space in homes, offices, and other areas where people may want to display potted plants. Further, there is a long-felt need in the art for a plant display device that prevents children and pets from knocking over plants and making a mess. Finally, there is a long-felt need in the art for a plant display device that requires no tools and does not damage any surface area.

The subject matter disclosed and claimed herein, in one embodiment thereof, comprises a plant display device. The device can be anchored within a window and is capable of supporting several potted plants simultaneously. The plant display device comprises a pair of independent vertical bars aligned vertically on opposite sides of the window and clamped into place. Then, multiple horizontal bars are installed at different heights along the vertical length. Each horizontal bar can support several potted plant holders held in place by a nut and bolt fixture. Users can screw the nut and bolt fixtures onto the horizontal bars to display their potted plants within the circular holders. Users can display their plants in a custom manner without worry of the plants being dropped or knocked over by children, pets, etc.

In this manner, the plant display device of the present invention accomplishes all of the foregoing objectives and provides users with a device that displays multiple plants in a convenient location. The device displays multiple plants in a customized arrangement. The device enables users to adjust the plant holders as desired.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a plant display device. The device can be anchored within a window and is capable of supporting several potted plants simultaneously. The plant display device comprises vertical bars aligned vertically on a window and secured into place. Then, multiple horizontal bars are installed at different heights along the vertical length. Each horizontal bar can support several potted plant holders for displaying plants. Thus, users can display their plants in a customized manner without worry of the plants being dropped, knocked over, or gotten into by small children, pets, etc.

In one embodiment, the plant display device supports multiple potted plants within a window. The device utilizes a torsion anchor system for supporting the multiple potted plants. The device also secures the plants within a window, such that children and pets are prevented from accessing the plants and making a mess. The device saves considerable space when displaying plants. Further, the plant display device requires no tools and does not damage any surface area of the window.

In one embodiment, the plant display device comprises a pair of independent vertical bars aligned vertically on opposite sides of the window and clamped into place. The vertical bars are of varying length, depending on the size of the window to which they will be applied. The device requires no permanent modifications to a window and windowsill. Typically, the vertical bars are a torsion bar with a clamp on the opposing top and bottom ends. The vertical bars are aligned vertically on opposite sides of the window, then extended lengthwise to reach the top and bottom of the window and clamped into place for use.

In one embodiment, multiple horizontal bars are installed at different heights along the vertical length of the vertical bars. The horizontal bars can be of varying length, depending on the needs and/or wants of a user. Typically, the horizontal bars do not extend all the way across the window, but only halfway across. Further, there are typically three horizontal bars positioned on each vertical bar. The horizontal bars extend out from the vertical bars toward the middle of the window. The horizontal bars are secured to the vertical bars via a pivot sleeve or adjoining sleeve, which is then held in place by a cotter pin or other securing means. The pivot sleeve allows the horizontal bar to rotate around the vertical bar. The horizontal bars can swivel back and forth, allowing a user to access the window, as needed.

In one embodiment, each horizontal bar can support several potted plant holders. The potted plant holders are typically circular components with varying diameters. Potted plants are inserted inside the circular holders and retained for display. Typically, the potted plant holders are held in place by a nut and bolt fixture. Users can screw the nut and bolt fixtures onto the plurality of through holes of the horizontal bars to display their potted plants within the circular holders. Typically, up to three potted plant holders can be supported on each horizontal bar. The horizontal bars with the potted plant holders provide multiple rotating arms that are jointed segments, which allows them to articulate or swing. Thus, users can adjust the plant holders to various angles and positions to customize their display in the window. Further, with this articulation, the device enables the plants in the window to receive sunlight for photosynthesis and also the option to be moved up to 180 degrees, thus creating floor space, optimal display, and catering to the user's desire to access their windows.

In one embodiment, the plant display device and its components are manufactured of metal, such as aluminum or stainless steel, or from heat-sealable plastic or polymers, such as polypropylene or acrylonitrile-butadiene-styrene (ABS), acrylic, polycarbonate, polyethylene, polyethylene terephthalate, polyvinyl chloride, polystyrene, etc. Generally, the plant display device is also manufactured from a material that is water resistant or waterproof or comprises a coating that is water resistant or waterproof. Furthermore, the device can be manufactured in various colors and patterns to match existing decor, based upon a user's preference.

In yet another embodiment, the plant display device comprises a plurality of indicia.

In yet another embodiment, a method of displaying multiple plants within a window is disclosed. The method includes the steps of providing a plant display device comprising a pair of vertical bars with multiple horizontal bars secured. The method also comprises securing the pair of vertical bars on opposite sides of a window. Further, the method comprises attaching horizontal bars at different heights along the vertical length. The method also comprises securing multiple potted plant holders on the horizontal bars. Finally, the method comprises placing potted plants within the holders to display the plants.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
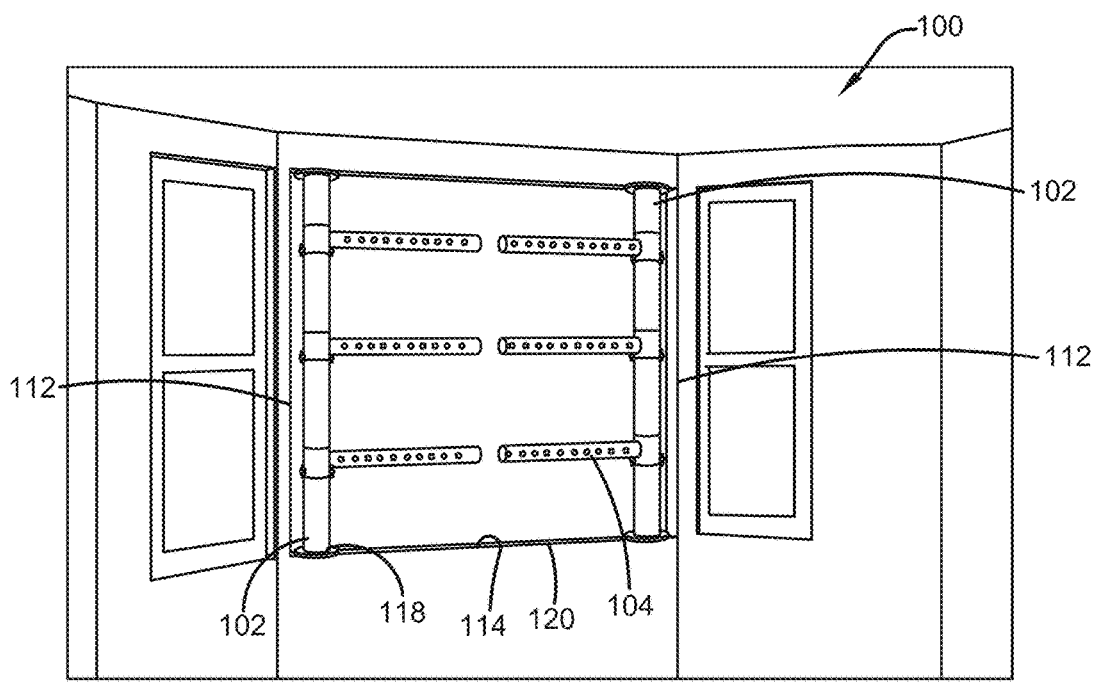
FIG. 1 illustrates a perspective view of one embodiment of the plant display device of the present invention showing the device installed on a window in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a plant display device that provides users with a torsion anchor system for windows that can support potted plants. There is also a long-felt need in the art for a plant display device that features a vertical clamping bar on both sides of the window that supports multiple adjustable horizontal bars and potted plant holders. Further, there is a long-felt need in the art for a plant display device that enables users to adjust the plant holders to various angles and positions to customize their look in the window. Moreover, there is a long-felt need in the art for a device that saves considerable space in homes, offices, and other areas where people may want to display potted plants. Further, there is a long-felt need in the art for a plant display device that prevents children and pets from knocking over plants and making a mess. Finally, there is a long-felt need in the art for a plant display device that requires no tools and does not damage any surface area.

The present invention, in one exemplary embodiment, is a novel plant display device. The device can be anchored within a window and is capable of supporting several potted plants simultaneously. The plant display device comprises a pair of independent vertical bars aligned vertically on opposite sides of the window and clamped into place. Then, multiple horizontal bars are installed at different heights along the vertical length. Each horizontal bar can support several potted plant holders held in place by a nut and bolt fixture. Users can screw the nut and bolt fixtures onto the horizontal bars to display their potted plants within the circular holders. The present invention also includes a novel method of displaying multiple plants within a window. The method includes the steps of providing a plant display device comprising a pair of vertical bars with multiple horizontal bars secured. The method also comprises securing the pair of vertical bars on opposite sides of a window. Further, the method comprises attaching horizontal bars at different heights along the vertical length. The method also comprises securing multiple potted plant holders on the horizontal bars. Finally, the method comprises placing potted plants within the holders to display the plants.

Referring initially to the drawings, FIG. 1 illustrates a perspective view of one embodiment of the plant display device 100 of the present invention. In the present embodiment, the plant display device 100 is an improved plant display device 100 that provides a user with a convenient means for displaying multiple plants 108 simultaneously within a window 110. Specifically, the plant display device 100 comprises a pair of vertical bars 102 aligned on window 110, with horizontal bars 104 attached at different heights. Each horizontal bar 104 can support several potted plant holders 106 for displaying plants 108. Thus, users can display their plants 108 in a customized manner.

Generally, the plant display device 100 supports multiple potted plants 108 within a window 110. The device 100 utilizes a torsion anchor system for supporting the multiple potted plants 108. The device 100 also secures the plants 108 within a window 110, such that children and pets are prevented from accessing the plants 108 and making a mess. The device 100 saves considerable space when displaying plants 108. Further, the plant display device 100 requires no tools and does not damage any surface area of the window 110.

Figure 2:
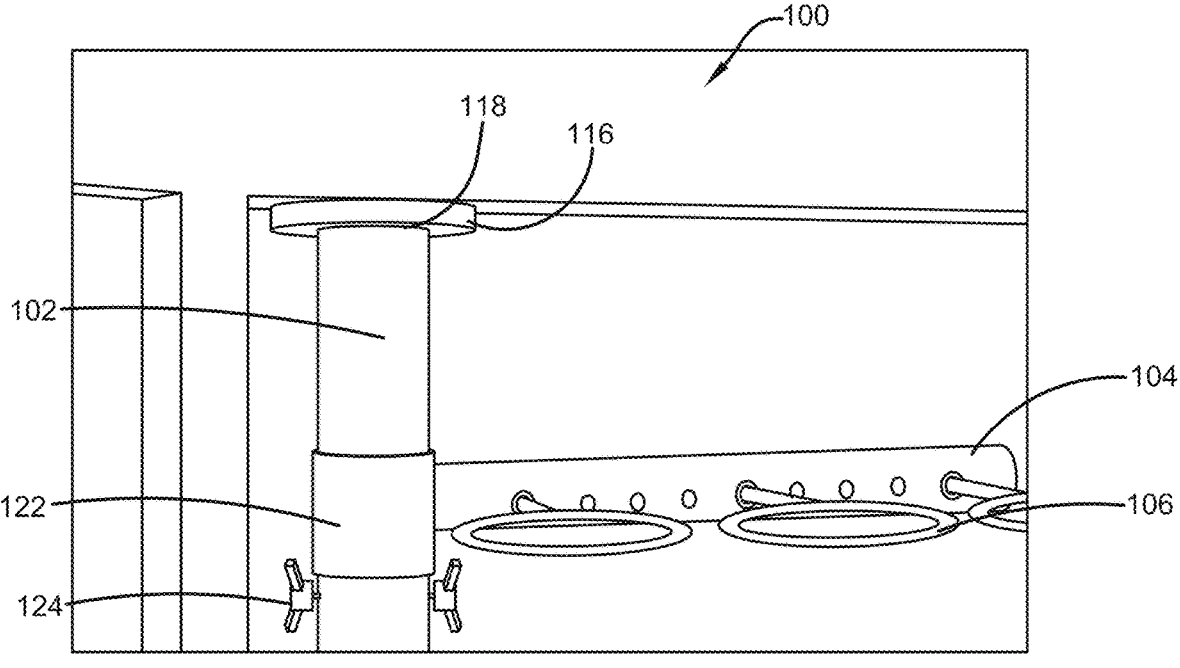
FIG. 2 illustrates a perspective view of one embodiment of the plant display device of the present invention showing the vertical bars anchored within a window in accordance with the disclosed architecture.

As shown in FIG. 2, the plant display device 100 comprises a pair of independent vertical bars 102 aligned vertically on opposite sides 112 of the window 110 and clamped into place. The vertical bars 102 are of varying length, depending on the size of the window 110 to which they will be applied. The device 100 requires no permanent modifications to a window 110 and windowsill 114. Typically, the vertical bars 102 are a torsion bar with a clamp 116 on the opposing top and bottom ends 118. The vertical bars 102 are aligned vertically on opposite sides 112 of the window 110, then extended lengthwise to reach the top and bottom 120 of the window 110 and clamped into place for use.

Figures 3, 4, 5:
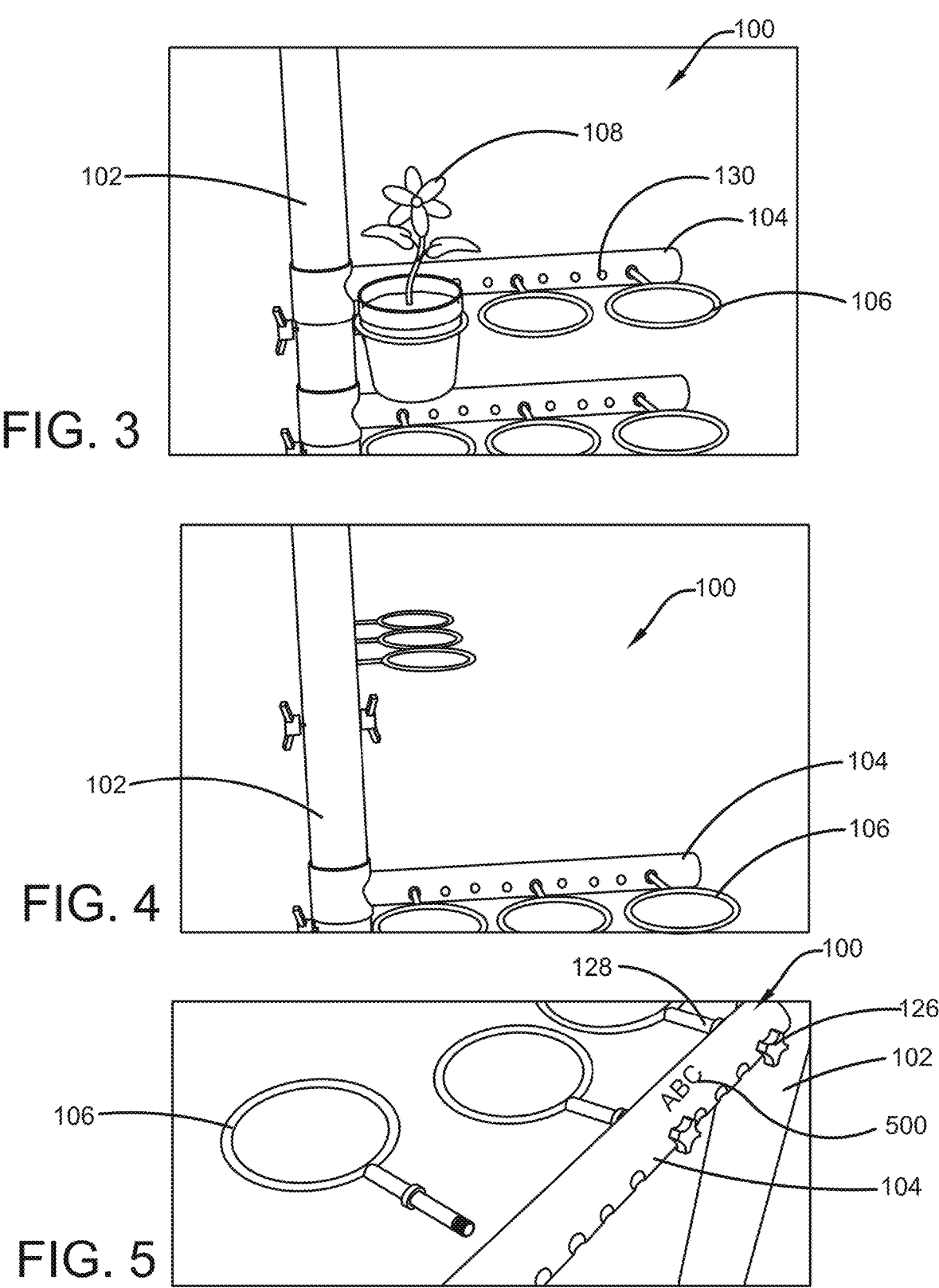
FIG. 3 illustrates a perspective view of one embodiment of the plant display device of the present invention showing the multiple plant holders installed on the horizontal bars in accordance with the disclosed architecture.
FIG. 4 illustrates a perspective view of one embodiment of the plant display device of the present invention showing how the horizontal bars are adjustable in accordance with the disclosed architecture.
FIG. 5 illustrates a perspective view of one embodiment of the plant display device of the present invention showing the plant holders secured via nut and bolt fixtures in accordance with the disclosed architecture.

As shown in FIG. 3, multiple horizontal bars 104 are installed at different heights along the vertical length of the vertical bars 102. The horizontal bars 104 can be of varying length, depending on the needs and/or wants of a user. Typically, the horizontal bars 104 do not extend all the way across the window 110, but only halfway across. Further, there are typically three horizontal bars 104 positioned on each vertical bar 102. The horizontal bars 104 extend out from the vertical bars 102 toward the middle of the window 110. The horizontal bars 104 are secured to the vertical bars 102 via a pivot sleeve 122 or adjoining sleeve, which is then held in place by a cotter pin 124 or other securing means. The pivot sleeve 122 allows the horizontal bar 104 to rotate around the vertical bar 102. The horizontal bars 104 can swivel back and forth, allowing a user to access the window 110, as needed.

As shown in FIG. 4, each horizontal bar 104 can support several potted plant holders 106. The potted plant holders 106 are typically circular components with varying diameters. Potted plants 108 are inserted inside the circular holders 106 and retained for display. Typically, the potted plant holders 106 are held in place by a nut 126 and bolt 128 fixture. Users can screw the nut 126 and bolt 128 fixtures onto the plurality of through holes 130 of the horizontal bars 104 to display their potted plants 108 within the circular holders 106. Typically, up to three potted plant holders 106 can be supported on each horizontal bar 104. The horizontal bars 104 with the potted plant holders 106 provide multiple rotating arms that are jointed segments, which allows them to articulate or swing. Thus, users can adjust the plant holders 106 to various angles and positions to customize their display in the window 110. Further, with this articulation, the device 100 enables the plants 108 in the window 110 to receive sunlight for photosynthesis and also the option to be moved up to 180 degrees, thus creating floor space, optimal display, and catering to the user's desire to access their windows 110.

As shown in FIG. 5, the plant display device 100 and its components are manufactured of metal, such as aluminum or stainless steel, or from heat-sealable plastic or polymers, such as polypropylene or acrylonitrile-butadiene-styrene (ABS), acrylic, polycarbonate, polyethylene, polyethylene terephthalate, polyvinyl chloride, polystyrene, etc. Generally, the plant display device 100 is also manufactured from a material that is water resistant or waterproof or comprises a coating that is water resistant or waterproof. Furthermore, the device 100 can be manufactured in various colors and patterns to match existing decor, based upon a user's preference.

In yet another embodiment, the plant display device 100 comprises a plurality of indicia 500. The horizontal 104 or vertical 102 bars of the device 100 may include advertising, a trademark, or other letters, designs, or characters, printed, painted, stamped, or integrated into the horizontal 104 or vertical 102 bars, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be window, potted plants, or brand related.

Figure 6:
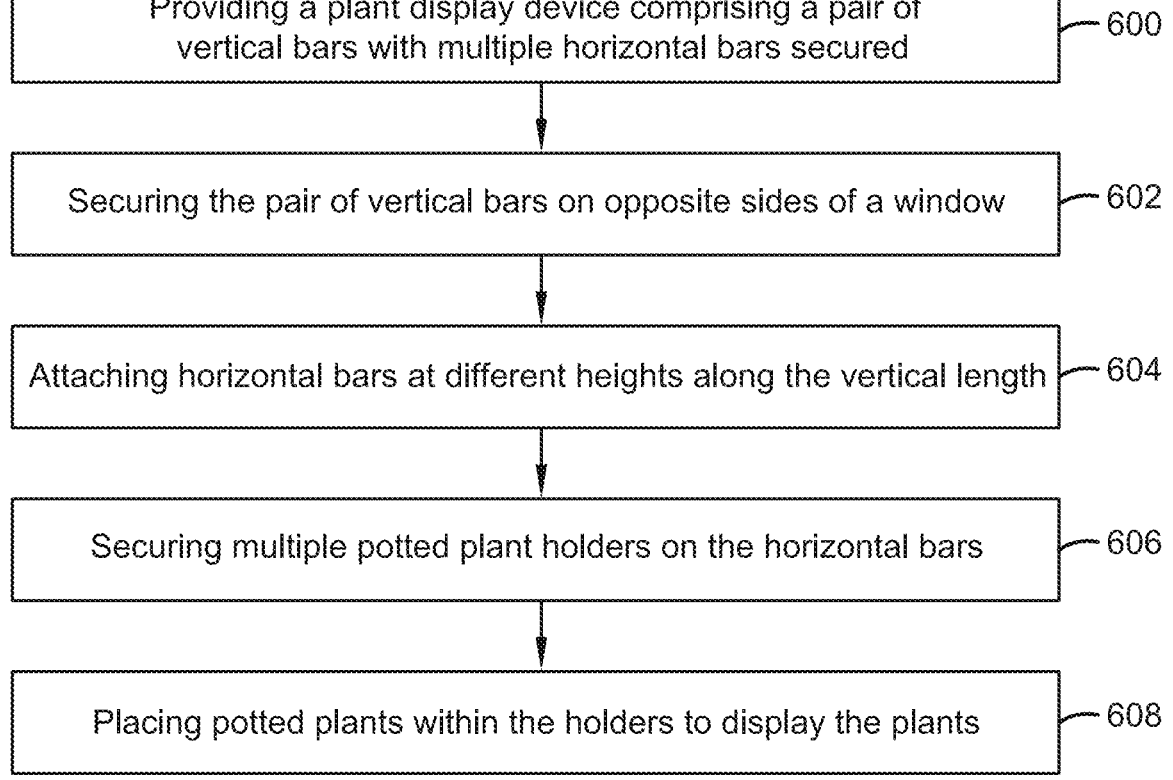
FIG. 6 illustrates a flowchart showing the method of displaying multiple plants within a window in accordance with the disclosed architecture.

FIG. 6 illustrates a flowchart of the method of displaying multiple plants within a window. The method includes the steps of at 600, providing a plant display device comprising a pair of vertical bars with multiple horizontal bars secured. The method also comprises at 602, securing the pair of vertical bars on opposite sides of a window. Further, the method comprises at 604, attaching horizontal bars at different heights along the vertical length. The method also comprises at 606, securing multiple potted plant holders on the horizontal bars. Finally, the method comprises at 608, placing potted plants within the holders to display the plants.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "plant display device", "plant device", "display device", and "device" are interchangeable and refer to the plant display device 100 of the present invention.

Notwithstanding the foregoing, the plant display device 100 of the present invention can be of any suitable size and configuration as is known in the art without affecting the overall concept of the invention, provided that it accomplishes the above-stated objectives. One of ordinary skill in the art will appreciate that the plant display device 100 as shown in FIGS. 1-6 is for illustrative purposes only, and that many other sizes and shapes of the plant display device 100 are well within the scope of the present disclosure. Although the dimensions of the plant display device 100 are important design parameters for user convenience, the plant display device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A plant display device that provides a user with a means for displaying multiple plants, the plant display device comprising:
   a pair of vertical bars;
   multiple horizontal bars; and
   at least one potted plant holder;
   wherein the pair of vertical bars are aligned vertically on opposite sides of a window;
   wherein the multiple horizontal bars are installed on the pair of vertical bars;
   wherein the at least one potted plant holder is secured to one of the multiple horizontal bars;
   wherein the pair of vertical bars comprise a clamp on opposing top and bottom ends of the pair of vertical bars to secure it in place; and
   further wherein users can display their plants in a customized manner.

2. The plant display device of claim 1, wherein the pair of vertical bars are extended lengthwise to reach a top and bottom of the window and clamped into place for use.

3. The plant display device of claim 2, wherein multiple horizontal bars are installed at different heights along a vertical length of the pair of vertical bars.

4. The plant display device of claim 3, wherein there are three horizontal bars positioned on each vertical bar.

5. The plant display device of claim 4, wherein the horizontal bars extend out from the vertical bars toward a middle of the window.

6. The plant display device of claim 5, wherein the horizontal bars are secured to the vertical bars via a pivot sleeve, which is then held in place by a cotter pin.

7. The plant display device of claim 6, wherein the pivot sleeve and cotter pin allows the horizontal bars to rotate around the vertical bar, allowing a user to access the window.

8. The plant display device of claim 7, wherein the horizontal bars comprise a plurality of through-holes.

9. The plant display device of claim 8, wherein each horizontal bar supports three potted plant holders.

10. The plant display device of claim 9, wherein the potted plant holders are circular components with varying diameters, for accepting potted plants for display.

11. The plant display device of claim 10, wherein the potted plant holders are held in place by a nut and bolt fixture, which is inserted into a through hole of the horizontal bars.

12. The plant display device of claim 11, wherein the horizontal bars and the potted plant holders are adjusted to various angles and positions to customize a user's plant display in the window.

13. A plant display device that provides a user with a means for displaying multiple plants, the plant display device comprising:
   a pair of vertical bars with a clamp on opposing top and bottom ends of the pair of vertical bars to secure them in place;
   three horizontal bars; and
   at least one potted plant holder, which is a circular component for retaining a potted plant;
   wherein the pair of vertical bars are aligned vertically on opposite sides of a window;
   wherein the pair of vertical bars are extended lengthwise to reach a top and bottom of the window and clamped into place for use;
   wherein the three horizontal bars are installed at different heights along a vertical length of each of the pair of vertical bars;
   wherein the three horizontal bars extend out from the pair of vertical bars toward a middle of the window;
   wherein the three horizontal bars are secured to the pair of vertical bars via a pivot sleeve, which is then held in place by a cotter pin;
   wherein the three horizontal bars comprise a plurality of through-holes;
   wherein the at least one potted plant holder is secured to one of the three horizontal bars via a nut and bolt fixture, which is inserted into a through hole; and
   further wherein the three horizontal bars and the at least one potted plant holder is adjusted to various angles and positions to customize a user's plant display in the window.

14. The plant display device of claim 13, wherein the pivot sleeve and cotter pin allows the three horizontal bars to rotate around the pair of vertical bars, allowing a user to access the window.

15. The plant display device of claim 13, wherein the plant display device is manufactured of metal or plastic.

16. The plant display device of claim 13, wherein the plant display device is manufactured from a material that is water resistant or waterproof, or comprises a coating that is water resistant or waterproof.

17. The plant display device of claim 13, wherein the plant display device is manufactured in various colors and patterns to match existing décor.

18. The plant display device of claim 13 further comprising a plurality of indicia.

\* \* \* \* \*